(12) United States Patent
Thomas et al.

(10) Patent No.: US 7,756,525 B1
(45) Date of Patent: Jul. 13, 2010

(54) CONTINUOUS DYNAMIC MOBILE QUERYING

(75) Inventors: Carol R. Thomas, Murrieta, CA (US);
Kevin K. Gold, San Diego, CA (US);
Michael L Reed, San Diego, CA (US);
Todd A. Walter, Poway, CA (US)

(73) Assignee: Teradata US, Inc., Miamisburg, OH (US)

( * ) Notice: Subject to any disclaimer, the term of this patent is extended or adjusted under 35 U.S.C. 154(b) by 734 days.

(21) Appl. No.: 10/244,219

(22) Filed: Sep. 16, 2002

(51) Int. Cl.
*H04Q 7/20* (2006.01)

(52) U.S. Cl. .................. 455/456.1; 455/414.3; 455/517

(58) Field of Classification Search ... 455/456.1–456.6, 455/457, 435, 432.1, 432.3, 414.3, 435.1, 455/517
See application file for complete search history.

(56) References Cited

U.S. PATENT DOCUMENTS

| | | | | |
|---|---|---|---|---|
| 4,775,999 A * | 10/1988 | Williams | .................. | 455/435.1 |
| 5,579,535 A * | 11/1996 | Orlen et al. | .................. | 455/421 |
| 6,011,975 A * | 1/2000 | Emery et al. | .............. | 455/456.1 |
| 6,377,791 B1 * | 4/2002 | Pirila | .......................... | 455/410 |
| 6,452,498 B2 * | 9/2002 | Stewart | .................... | 455/456.1 |
| 6,539,015 B2 * | 3/2003 | Voit | ............................. | 370/389 |
| 6,600,930 B1 * | 7/2003 | Sakurai et al. | ........... | 455/414.3 |
| 6,628,632 B1 * | 9/2003 | Dolan | ...................... | 455/456.2 |
| 6,704,574 B2 * | 3/2004 | Lin | .......................... | 455/456.3 |
| 6,754,504 B1 * | 6/2004 | Reed | ....................... | 455/456.2 |
| 6,785,538 B2 * | 8/2004 | Nihei | ....................... | 455/456.1 |
| 2004/0203670 A1 * | 10/2004 | King et al. | ............... | 455/414.3 |
| 2004/0203851 A1 * | 10/2004 | Vetro et al. | .............. | 455/456.1 |
| 2004/0203860 A1 * | 10/2004 | Fellenstein et al. | ........ | 455/456.1 |
| 2004/0242209 A1 * | 12/2004 | Kruis et al. | .............. | 455/414.1 |

* cited by examiner

*Primary Examiner*—Lana N Le
(74) *Attorney, Agent, or Firm*—Howard Speight

(57) ABSTRACT

A continuous dynamic mobile query system including a mobile device is disclosed. The mobile device includes a mobile device memory, a query stored in the mobile device memory, a transmitter for continuously transmitting the query, a receiver for receiving a response, a mobile device output device for displaying the response. The system also includes a location source device for providing the location of the mobile device and a network adapted to receive the query and the location of the mobile device. The system also includes a database management system adapted to receive the query and the location of the mobile device from the network. The database management system is further adapted to execute the query taking into account the location of the mobile device to produce a response and provide the response to the network. The network is further adapted to receive the response from the database management system and transmit the response to the mobile device.

24 Claims, 7 Drawing Sheets

CONTINUOUS DYNAMIC MOBILE QUERYING

BACKGROUND

Today's society and its computing resources are becoming increasingly mobile. People are moving from "anchored" home- or work-based personal computer (PC) computing to mobile computing on Personal Digital Assistants (PDAs), mobile phones and pagers. This mobile technology creates opportunities for holders of such technology to electronically interact with people and things they encounter as they move about.

Further, businesses frequently have a difficult time getting their advertisements to interested consumers. At the same time, consumers are inundated with advertisements and other messages, most of which are of no interest, and may miss the impact of advertising or other messages that would be of interest. As advertisements and other messages are delivered to mobile devices, as described above, the chance that an advertisement will reach an interested consumer will grow even smaller. Providing a link between businesses and mobile consumers that might be interested in the businesses' goods and services is a challenge.

SUMMARY

In general, in once aspect, the invention features a continuous dynamic mobile query system including a mobile device. The mobile device includes a mobile device memory, a query stored in the mobile device memory, a transmitter for continuously transmitting the query, a receiver for receiving a response, a mobile device output device for displaying the response. The system also includes a location source device for providing the location of the mobile device and a network adapted to receive the query and the location of the mobile device. The system also includes a database management system adapted to receive the query and the location of the mobile device from the network. The database management system is further adapted to execute the query taking into account the location of the mobile device to produce a response and provide the response to the network. The network is further adapted to receive the response from the database management system and transmit the response to the mobile device.

Implementations of the invention may include one or more of the following. The location source device may be part of the mobile device. The network may include a plurality of physically dispersed base stations, where each base station is adapted to communicate with the mobile device and to receive the query and the location of the mobile device when the mobile device is within the base station's geographic coverage area. The mobile device may be within a communicating base station's coverage area and the location source device may be adapted to report the location of the communicating base station. The mobile device may be adapted to transmit the query to a new base station if the mobile device moves into the coverage area for the new base station. The mobile device may be adapted to transmit the query if the query changes.

The network may include a communications network coupled to each of the plurality of physically dispersed base stations and to the database management system. Each of the plurality of physically dispersed base stations may include a cellular base station. The network may include a cellular network, a service provider coupled to the cellular network and adapted to receive the query and location of the mobile device from the cellular network and transmit the query and location of the mobile device to the database management system via the Internet. The cellular network may include the cellular signaling system.

The database management system may reside with the service provider. The database management system may include data responsive to the query. The database management system may be distributed among the base stations with the portion of the data stored with each base station being responsive to the query for the physical coverage area of that base station. The database management system may be distributed among the mobile device and a central location and the portion of the database management system distributed to the mobile device may be refreshed from the portion of the database management system distributed to the central location.

The query may include a shopping list, which may include a list of items. The database management system may include a procedure which has one or more parameters and the query may include the one or more parameters. The database management system may include information regarding a location and inventory of one or more subscribed businesses and the database management system may be adapted to provide a response to a query, which includes a shopping list, which includes one or more items, and a location of a mobile device. The response may include one or more subscribed businesses within a predetermined distance of the mobile device whose inventory includes one or more items from the shopping list.

In general, in another aspect, the invention features a mobile device for performing continuous dynamic querying. The mobile device includes a mobile device memory, a location source device for providing the location of the mobile device, a query stored in the mobile device memory, a transmitter for continuously transmitting the query and the location of the mobile device, a receiver for receiving a response to the query that takes into account the location of the mobile device, and a mobile device output device for displaying the information.

Implementations of the invention include one or more of the following. The transmitter may include a cellular system transmitter and the receiver may include a cellular system receiver. The transmitter may include a transmitter adapted to transmit data via the cellular signaling system and the receiver may include a receiver adapted to receive data via the cellular signaling system. The cellular signaling system may include a plurality of physically dispersed base stations, each having a geographic coverage area. The mobile device may communicate with a base station when it is within the coverage area of the base station. The transmitter may transmit the query and the location of the mobile device when the mobile device moves into one of the base station coverage areas. The mobile device may transmit the query and the location of the mobile device when the query changes. The mobile device may transmit the query and the location of the mobile device when the location of the mobile device changes a predetermined amount.

In general, in another aspect, the invention features a database management system including a massively parallel processing system, which includes one or more nodes, a plurality of CPUs, each of the one or more nodes providing access to one or more CPUs, a plurality of virtual processes each of the one or more CPUs providing access to one or more virtual processes, and a set of one or more database tables residing on the one or more nodes, the one or more database tables containing information organized by geographic location. One or more of the plurality of virtual processes is adapted to receive a query including one or more items, receive a location, and extract from the set of one or more database tables information responsive to the query and related to the location.

Implementations of the invention may include one or more of the following. One or more of the nodes may reside on a mobile device. The nodes may be distributed geographically and each node may have a location. The one or more database tables may be distributed among the nodes with information related to locations within a predetermined distance from the location of a node being stored on that node.

In general, in another aspect, the invention features a continuous dynamic mobile query system including a mobile device. The mobile device includes a mobile device memory, a shopping list stored in the mobile device memory, a transmitter for continuously transmitting the shopping list; a receiver for receiving information concerning businesses within a predetermined distance of the mobile device that carry items on the shopping list, and a mobile device output device for displaying the information. The system further includes a location source device for providing the location of the mobile device and a network. The network includes a plurality of physically dispersed cellular network base stations, each base station being adapted to communicate with the mobile device and to receive the shopping list and the location of the mobile device when the mobile device is within the base station's geographic coverage area. The network further includes a cellular network coupled to the cellular network base stations and a service provider coupled to the cellular network and adapted to receive the shopping list and the location of the mobile device from the cellular network and transmit the shopping list and location of the mobile device to a database management system via the Internet. The database management system is adapted to receive the shopping list and the location of the mobile device from the network, and further adapted to locate businesses within a predetermined distance of the location of the mobile device having items matching the shopping list, and provide information about the located businesses to the network. The network is further adapted to receive the information regarding the located businesses from the database management system and transmit the information regarding the located businesses to the mobile device.

DETAILED DESCRIPTION

A continuous dynamic mobile querying system and method provides location specific answer sets to complex queries from a mobile device. In one example embodiment, these queries are automatically directed at database servers within a specific geographic location that is in proximity to the person with the requesting mobile device.

Figure 1:
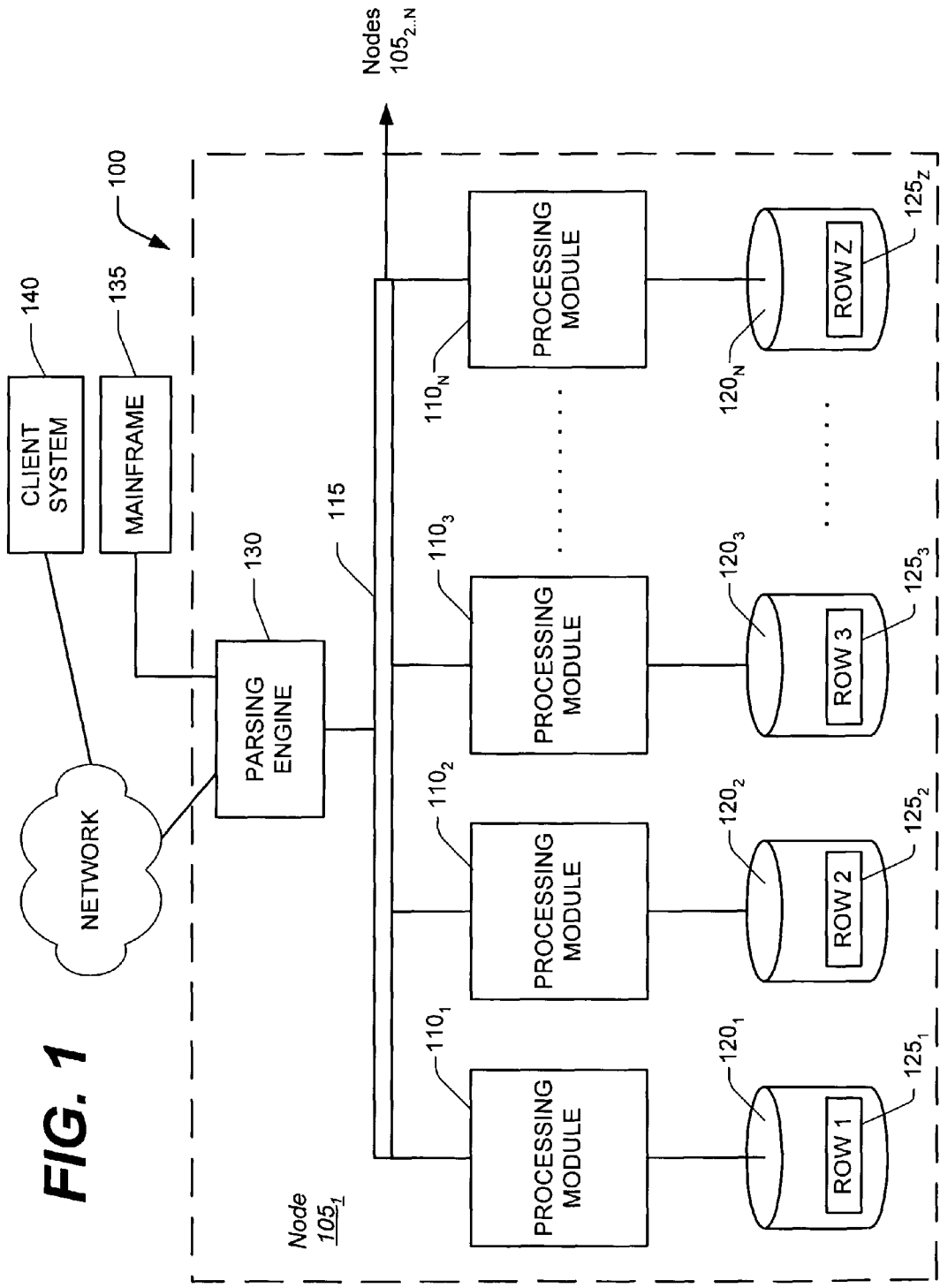
FIG. 1 is a block diagram of a node of a database system.

The techniques for continuous dynamic mobile querying as disclosed herein may be used with large databases that might contain many millions or billions of records managed by a database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries and commands to build tables in a standard format, such as SQL.

In one implementation, the rows 125$_{1 \ldots Z}$ are distributed across the data-storage facilities 120$_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 120$_{1 \ldots N}$ and associated processing modules 110$_{1 \ldots N}$ by a hash bucket map. The characteristics of the columns chosen for the primary index determine how evenly the rows are distributed.

Figure 2:
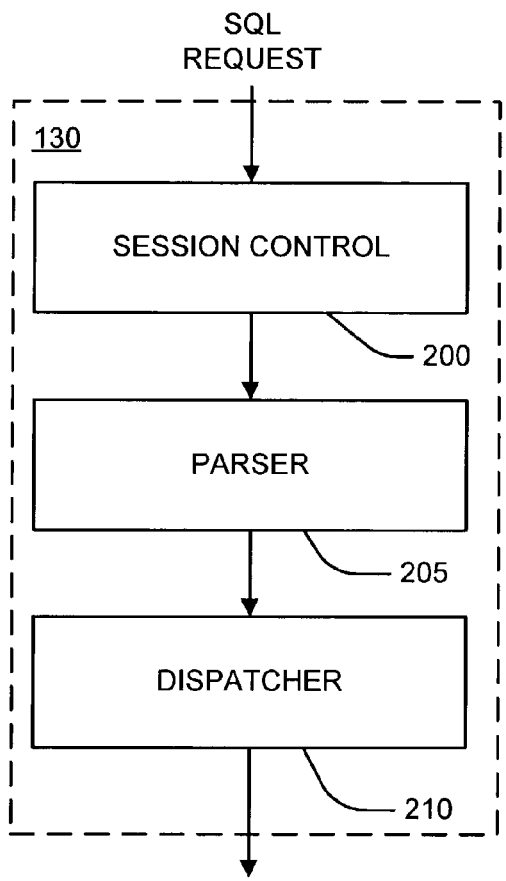
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
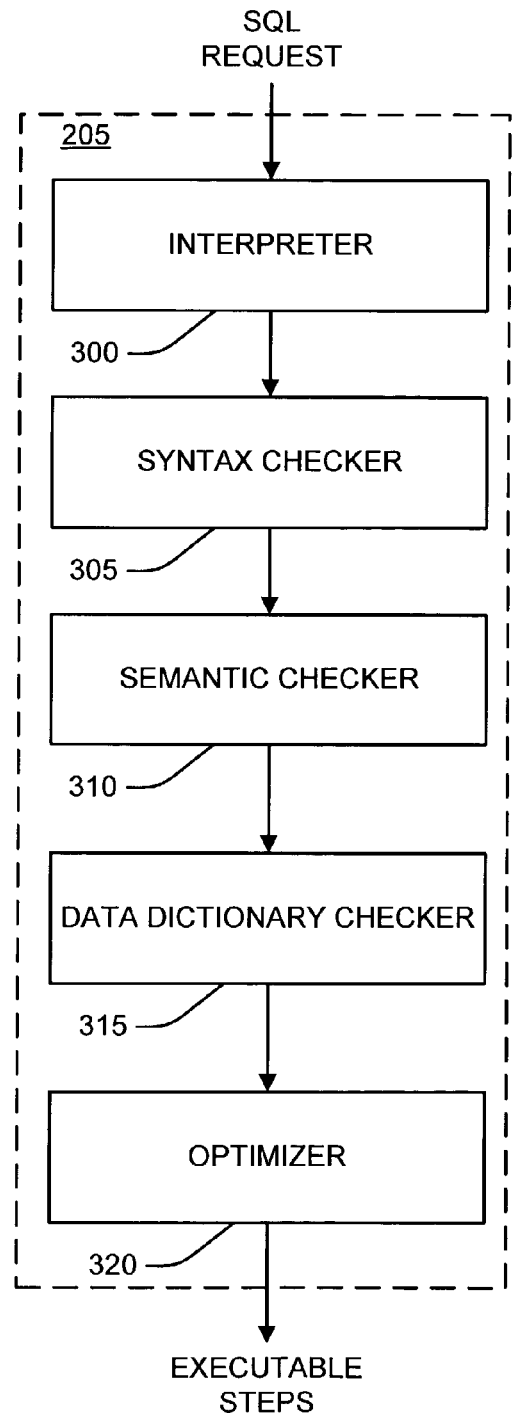
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
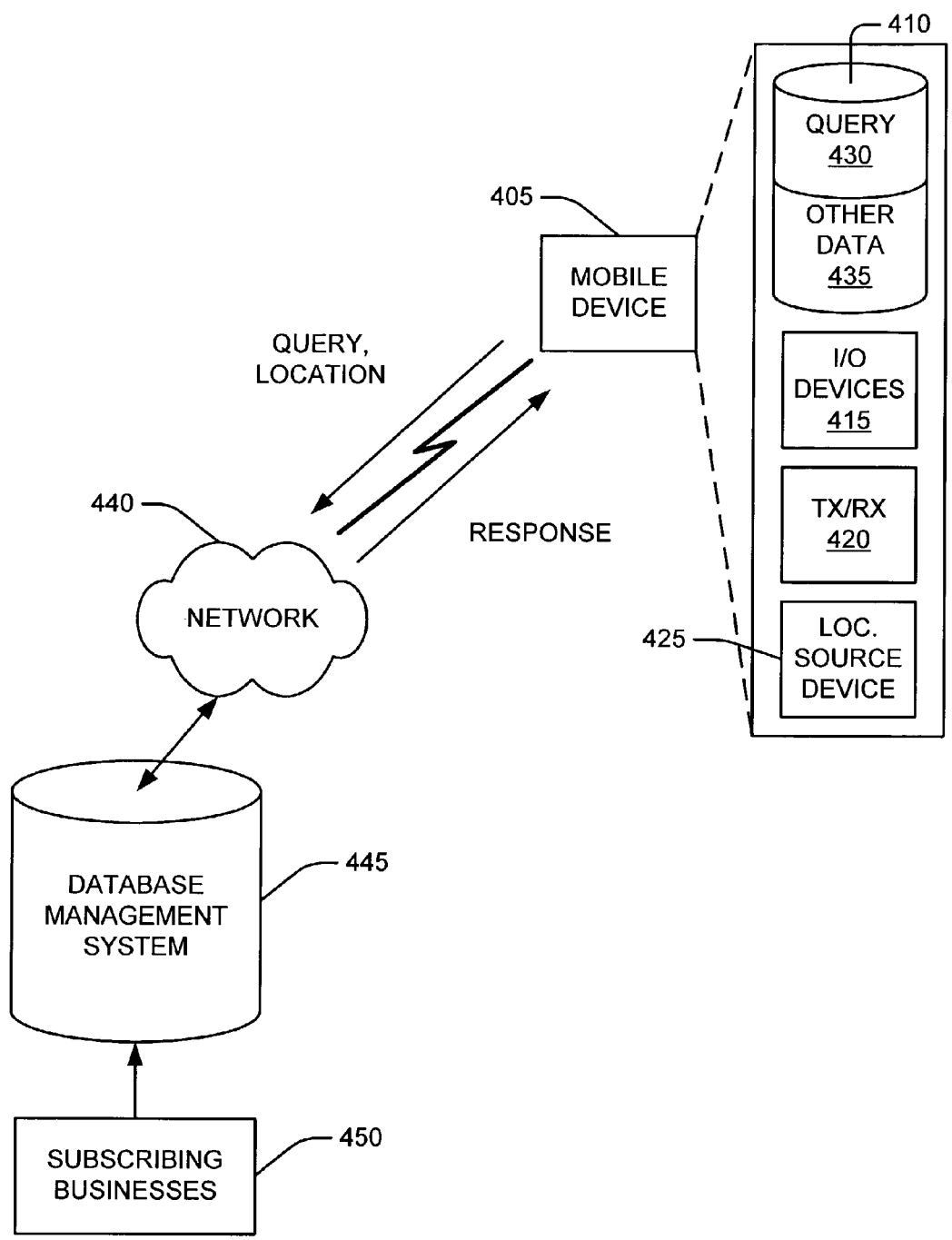
FIGS. 4-7 are block diagrams of continuous dynamic mobile querying systems.

One example system to perform continuous dynamic mobile querying, illustrated in FIG. 4, includes a mobile device 405, which includes a mobile device memory 410, input/output devices 415, a transmitter/receiver 420, and a location source device 425. The mobile device 405 can be a personal digital assistant (PDA), a cellular telephone, a pager, a portable computer, or any other portable electronic device. The mobile device memory can be conventional memory found in such devices, including hard drives, CD ROMs, DVD ROMs, floppy disk drives, random access memory, programmable random access memory, electrically alterable random access memory, and the like. The input/output devices 415 can be keyboards of any size, mice, stylus interfaces, microphones, cathode ray monitors, liquid crystal monitors, and the like. The transmitter/receiver 420 can be configured to operate as a point-to-point communications device or it can be configured to operate within a network, such as a radio-telephone network, a cellular network, a Blue Tooth network, or the like. The location source device 425, which produces the location of the mobile device 405, can be a device that derives location from the Global Position Satellite System, from LORAN, from systems that determine location based on cellular network signals, and the like.

In an alternative embodiment, the location source device 425 is separate from mobile device. For example, if the mobile device is a cellular telephone communicating with a cellular base station, the location source device may be a device that reports the location of the cellular base station.

The mobile device memory holds a query 430 and it may include other data 435. In one example system, the query is a shopping list, which contains items that the holder of the mobile device 405 is interested in purchasing. In another example, the query is a set of parameters which can be used to complete a procedure stored in another location, as discussed below. The mobile device 405 allows the query, such as a shopping list, to be viewed and/or modified using the input/output devices.

The mobile device 405 transmits the query and the location of the location source device 425 to a network 440. As discussed above, the network 440 can be a radio network, a cellular network, a Blue Tooth network, or the like, or a combination of any or all of those networks. The network 440 transmits the query to a database management system 445, which maintains tables of information, some or all of which may be responsive to the query. In one example system, the data in the database management system is organized geographically. For example, the data may include a list of subscribing businesses, the location of the subscribing businesses and the inventories that each of the subscribing businesses carry. The data may be partitioned by location, such that businesses within a particular geographic area are located within a particular partition. The partition may be physical or logical.

The database management system can be any type of database management system including that illustrated in FIGS. 1-3, in which case the nodes of the database management system may be physically distributed over a small area or over the entire United States or even more broadly. Alternatively, the database management system can be a conventional relational database management system. An interface is provided to allow subscribers 450 to update information in the database management system.

The database management system 445 produces a response and transmits it through the network 440 to the mobile device 405, which displays information from the response on the input/output devices 415. In one example, the query may have been a shopping list and the response would be information regarding subscribing businesses that have in their inventories items included on the shopping list. In another example, the query is a set of parameters supplied to a procedure stored within the database management system. In another example, the query may have been a request for weather information and the response would be the weather forecast for the location of the mobile device 405. In still another example, the query may have been a request for traffic information and the response would be traffic information for the location of the mobile device 405.

Figure 5:
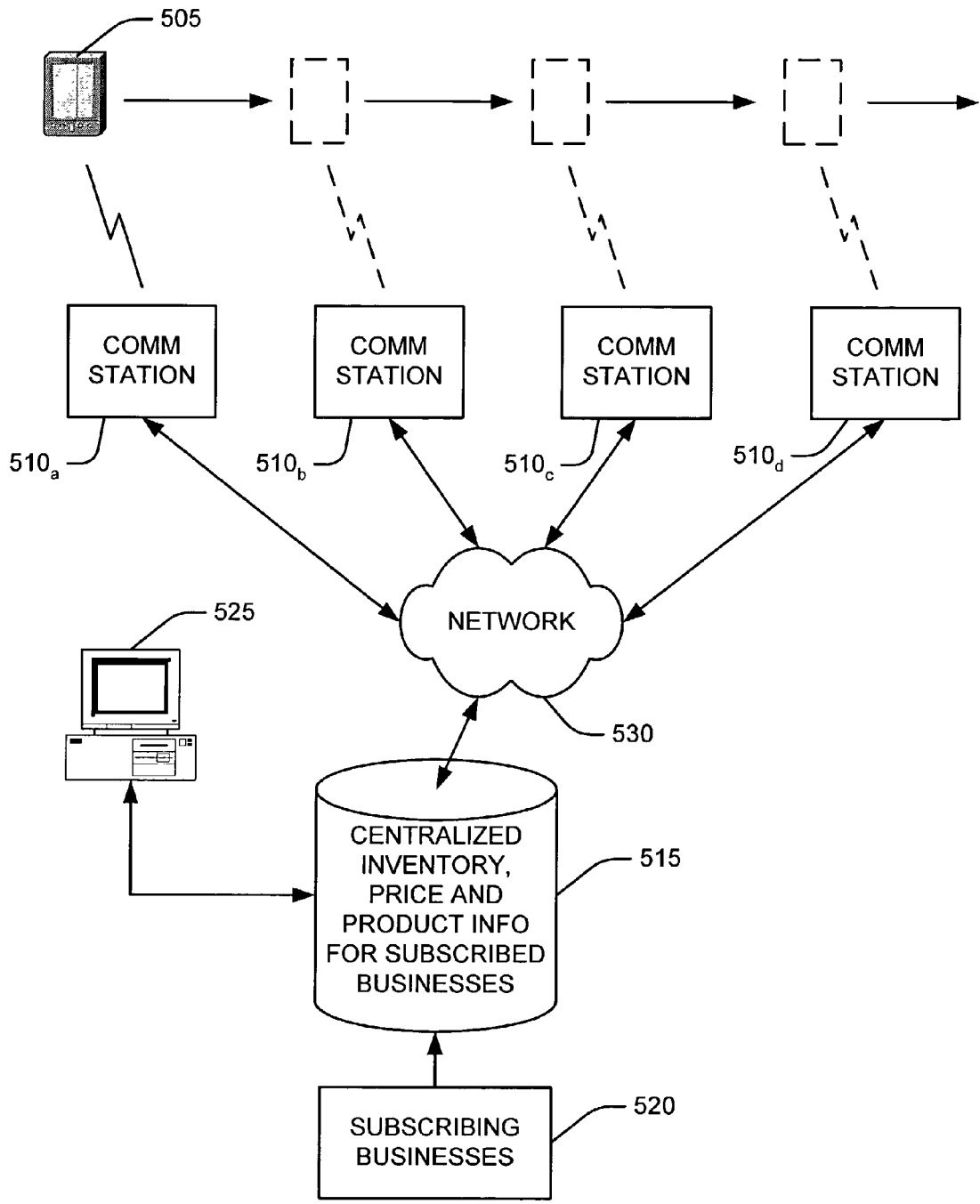

In another example, illustrated in FIG. 5, the system consists of:

1. A wireless device 505 (a PDA is shown) that:
    stores an individual's shopping list;
    issues continuous queries for the items on the shopping list.
2. A collection of communication base stations 510$_{a\ldots d}$ each of which:
    responds to queries from the mobile device 505 when it is in its coverage area.
3. A central database management system 515 that:
    contains inventory and price information on subscribed businesses 520;
    responds to queries from communication base stations 510$_{a\ldots d}$ distributed across the greater service area, in which the responses contain information on subscribed businesses and services only located within the requesting communication base station's service area.

In this example system, use of a central database management system ensures a single view of data. A workstation 525 is provided to maintain the database management system 515.

In this example system, when a mobile device 505 enters the coverage area for a base station 510$_a$, it issues a query, based on the prestored shopping list. The base station 510$_a$, receives the query and forwards it, via a network 530, to the centralized database management system 515, which contains inventory, price and product information for subscribed businesses. The database management system 515 responds, limiting the result to subscribed businesses and services within the requesting base station's 510$_a$ service area.

When the mobile device 505 leaves the coverage area for the first base station 510$_a$ and enters the coverage area for a second base station 510$_b$, it issues a query to that base station, again based on the prestored shopping list. The second base station 510$_b$, receives the query and forwards it, via a network 530, to the centralized database management system 515, which contains inventory, price and product information for subscribed businesses. The database management system 515 responds, limiting the result to subscribed businesses and services within the requesting base station's 510$_b$ service area.

As the mobile device 505 moves through the coverage areas of base stations 510$_a$, 510$_b$, 510$_c$ and 510$_d$, it receives responses with inventory information from each of the respective areas as it moves through them. Consequently, the user of the mobile device 505 is alerted when a nearby subscribing business has in its inventory an item from the prestored shopping list when the user is close enough to act on that information.

The mobile device 505 can also be configured to issue queries, such as a shopping list query, (a) continuously; (b) when the query (or shopping list) changes; (c) when the mobile device is powered on; or (d) under other similar circumstances.

Users can also issue queries for detailed product information while at a subscribing business site. Such a query is received by the communication base station and forwarded to the central database server for processing. In addition to the requested product information the server can respond with advertising incentives from subscribed businesses in the designated region.

Figure 6:
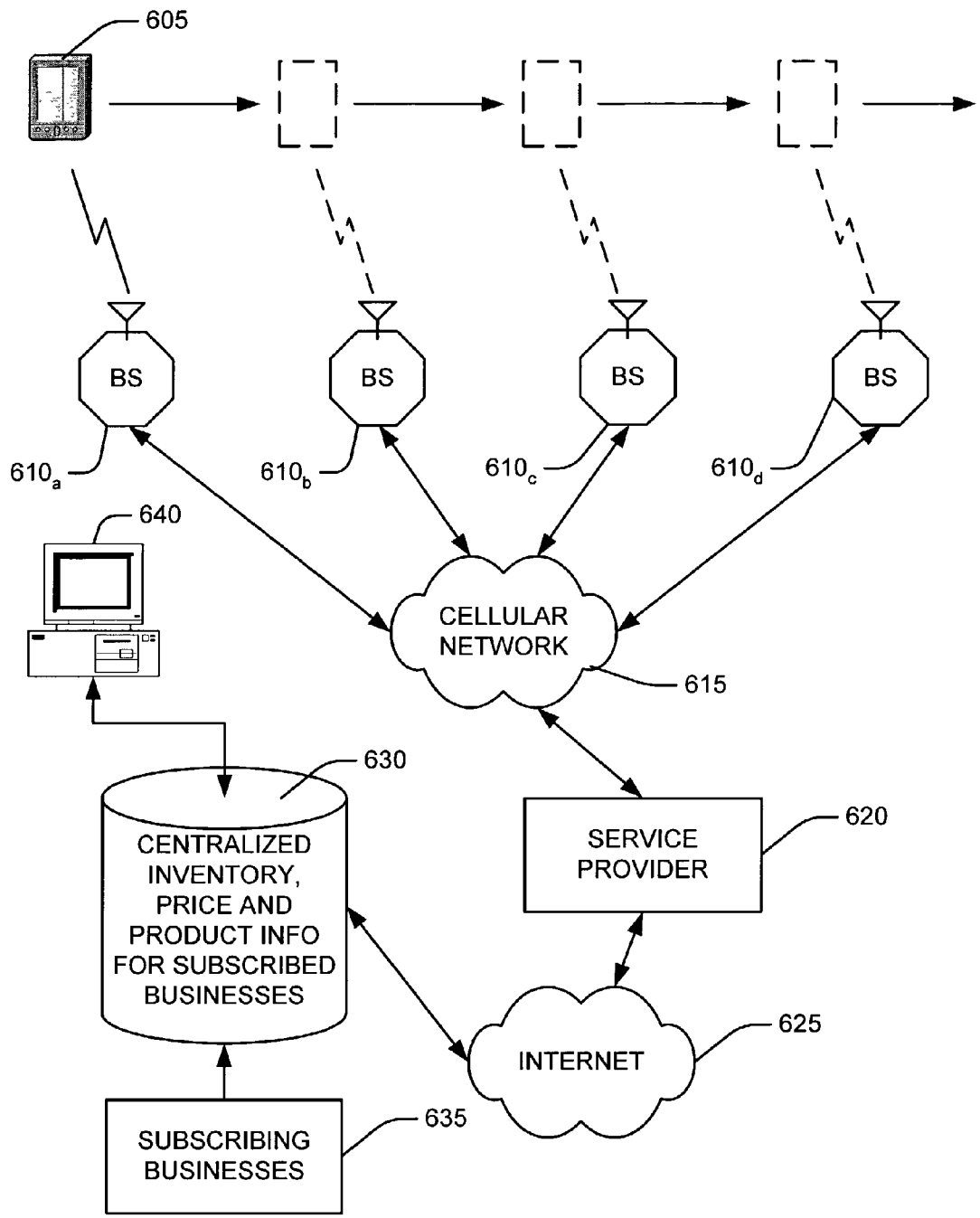

In another example system, illustrated in FIG. 6, the mobile device 605 moves through the service areas of multiple cellular base stations 610$_{a\ldots d}$ and issues queries, such as those described above, to each of the cellular base stations when it is in their respective coverage areas. The base stations $610_{a...d}$ transmit the queries through the cellular network 615 to a service provider 620. The service provider, which serves as an interface between the cellular network 615 and the Internet 625, forwards the queries over the Internet 625 to the database management system 630, which executes the query to produce a response. The response is returned to the mobile device 605 via the Internet 625, the service provider 620, the cellular network 615 and the base stations $610_{a...d}$. As before, subscribing businesses 635 can access and update the database management system either directly or through a maintenance system, illustrated by workstation 640.

Figure 7:
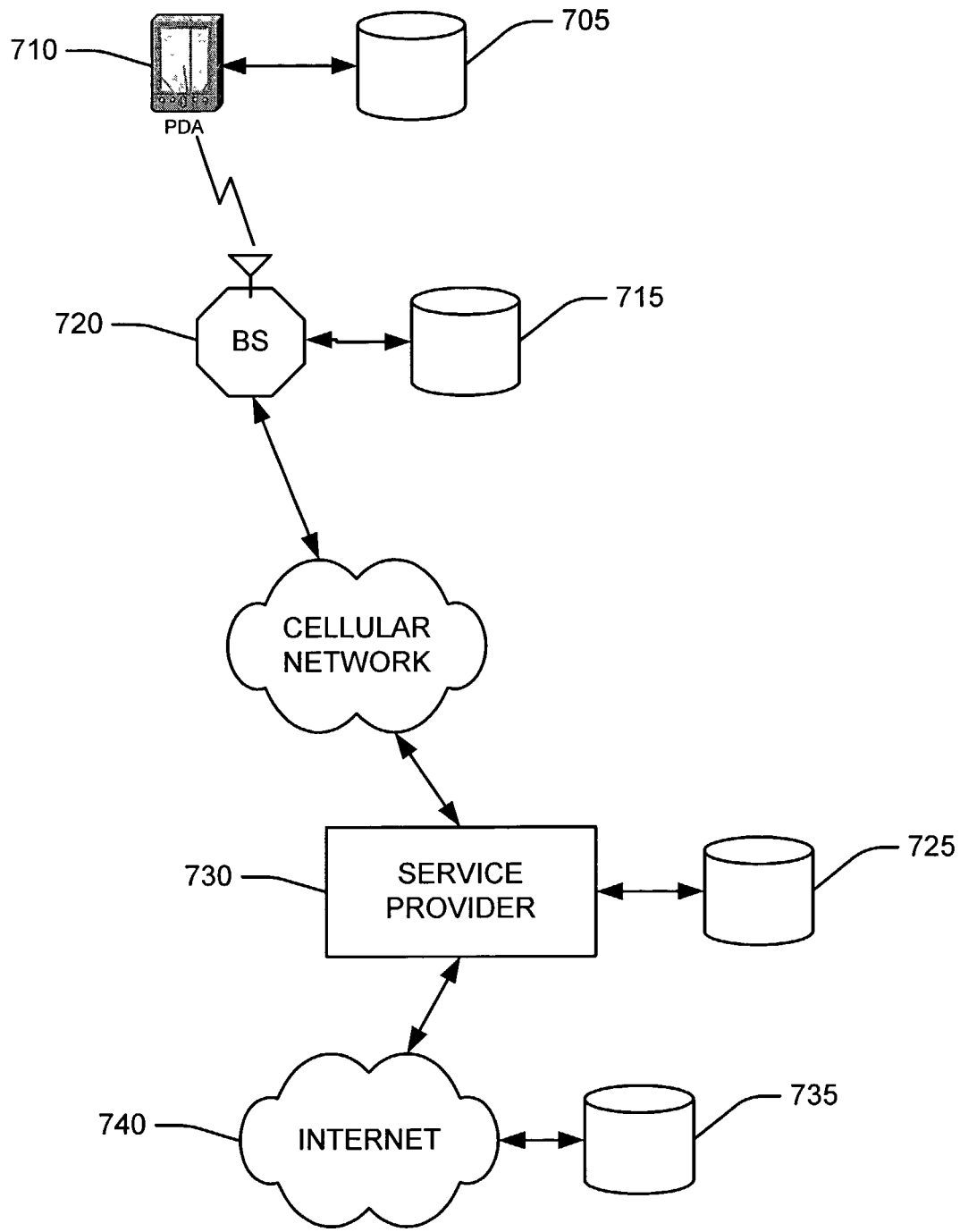

The location of the database management system is also variable, as shown in FIG. 7. All or a portion of the database management system can be stored in the mobile device memory 705 within the mobile device 710; stored on a storage facility 715 within the base station 720; stored on a storage facility 725 at the service provider 730; or attached as a storage facility 735 to the Internet 740. The database management system could be located in one of these locations or distributed among two or more. Further, the database management system could be a massively parallel system such as that illustrated in FIG. 1. The nodes of such a system might be in one physical location or they might be geographically distributed across a city, a state, the nation or the world.

Figure 8:
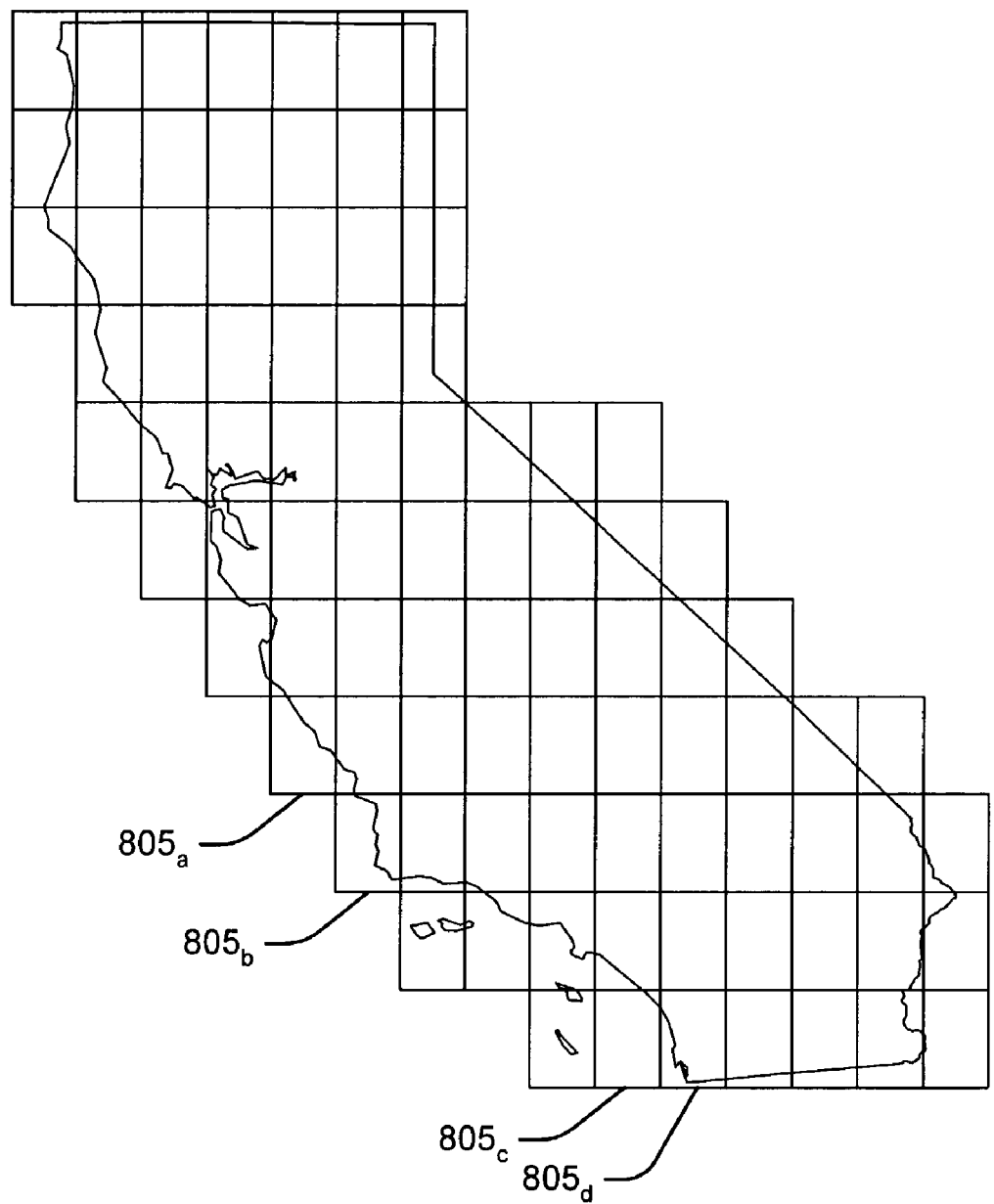
FIG. 8 illustrates regional service centers created by an example of the system disclosed herein.

As a result of the operation of this system, a country, state, city, neighborhood, or other geographical region is divided into regional service areas. For example, as shown in FIG. 8, such a system operating in California would divide the state into the illustrated regional service areas, e.g. $805_{a...d}$. Each of those regional service areas $805_{a...d}$ could be assigned to a branch of a service organization, such as car repair organizations. When the owner of a mobile device needed a car repair service, a query into the continuous mobile querying system would direct the user to the branch of the service organization covering that location. While the regional service areas $805_{a...d}$ are shown in FIG. 8 as rectangles, it will be understood that they can be non-rectangular, including circles, polygons or any other regular or irregular shape.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A continuous dynamic mobile query system comprising
   a mobile device comprising
      a mobile device memory;
      a query stored in the mobile device memory;
      a transmitter for transmitting the query;
      a receiver for receiving a response;
      a mobile device output device for displaying the response;
   a location source device for providing the location of the mobile device;
   a network that includes a plurality of physically dispersed base stations each having a respective geographic service area adapted to receive the query and the location of the mobile device; and
   a database management system adapted to receive the query and the location of the mobile device from the network, and further adapted to:
      execute the query to produce a response limited to services available in a geographic service area of a base station in which the mobile device is located; and
      provide the response to the network;
   the network being further adapted to
      receive the response from the database management system; and
      transmit the response to the mobile device.

2. The system of claim 1 where
   the location source device is part of the mobile device.

3. The system of claim 1
   wherein each base station is adapted to communicate with the mobile device and to receive the query and the location of the mobile device when the mobile device is within the base station's geographic coverage area.

4. The system of claim 3 wherein the mobile device is within a communicating base station's coverage area and wherein
   the location source device is adapted to report the location of the communicating base station.

5. The system of claim 3 wherein
   the mobile device moves from a first base station's geographic service area to a second base station's geographic service area, wherein the transmitter transmits the query to the second base station when the mobile device moves into the second base station's geographic service area.

6. The system of claim 3 wherein
   the mobile device is adapted to transmit the query if the query changes.

7. The system of claim 3 wherein the network comprises
   a communications network coupled to each of the plurality of physically dispersed base stations and to the database management system.

8. The system of claim 7 wherein
   each of the plurality of physically dispersed base stations comprises a cellular base station; and
   the network comprises:
      a cellular network;
      a service provider coupled to the cellular network and adapted to:
         receive the query and location of the mobile device from the cellular network; and
         transmit the query and location of the mobile device to the database management system via the Internet.

9. The system of claim 8 wherein
   the cellular network comprises the cellular signaling system.

10. The system of claim 8 wherein
    the database management system resides with the service provider.

11. The system of claim 3 wherein
    the database management system includes data responsive to the query; and
    the database management system is distributed among the base stations with the portion of the data stored with each base station being responsive to the query for the physical coverage area of that base station.

12. The system of claim 1 wherein
    the database management system is distributed among the mobile device and a central location and the portion of the database management system distributed to the mobile device is refreshed from the portion of the database management system distributed to the central location.

13. The system of claim 1 wherein
    the query comprises a shopping list, comprising a list of items.

14. The system of claim 1 wherein
the database management system comprises a procedure which has one or more parameters; and
the query comprises the one or more parameters.

15. The system of claim 1 wherein
the database management system comprises information regarding a location and inventory of one or more subscribed businesses; and
the database management system is adapted to provide a response to a query comprising a shopping list, which comprises one or more items, and a location of a mobile device, the response comprising one or more subscribed businesses within a predetermined distance of the mobile device whose inventory includes one or more items from the shopping list.

16. A mobile device for performing continuous dynamic querying comprising
a mobile device memory;
a location source device for providing the location of the mobile device;
a query stored in the mobile device memory;
a transmitter for transmitting the query and the location of the mobile device;
a receiver for receiving a response to the query from a network that includes a plurality of physically dispersed base stations each having a respective geographic service area, wherein the network receive the response from a database management system which execute the query based on the received location of the mobile device to produce the response that is limited to services available in a geographic service area of a base station in which the mobile device is located; and
a mobile device output device for displaying the information.

17. The mobile device of claim 16 wherein
the transmitter comprises a cellular system transmitter; and
the receiver comprises a cellular system receiver.

18. The mobile device of claim 17 wherein
the transmitter comprises a transmitter adapted to transmit data via the cellular signaling system; and
the receiver comprises a receiver adapted to receive data via the cellular signaling system.

19. The mobile device of claim 18 wherein
the cellular signaling system comprises a plurality of physically dispersed base stations, each having a geographic coverage area, and the mobile device communicates with a base station when it is within the coverage area of the base station; and
the transmitter transmits the query and the location of the mobile device when the mobile device moves into one of the base station coverage areas.

20. The mobile device of claim 16 wherein
the mobile device transmits the query and the location of the mobile device when the query changes.

21. The mobile device of claim 16 wherein
the mobile device transmits the query and the location of the mobile device when the location of the mobile device changes a predetermined amount.

22. The mobile device of claim 16 wherein
the query comprises a shopping list, which comprises a list of one or more items.

23. The mobile device of claim 22 wherein
the response to the query comprises information concerning one or more businesses within a predetermined distance of the mobile device that have items from the shopping list in their inventories.

24. A continuous dynamic mobile query system comprising:
a mobile device comprising:
a mobile device memory;
a shopping list stored in the mobile device memory;
a transmitter for transmitting the shopping list;
a receiver for receiving information concerning businesses within a geographic service area of a base station in which the mobile device is located that carry items on the shopping list;
a mobile device output device for displaying the information;
a location source device for providing the location of the mobile device;
a network comprising:
a plurality of physically dispersed cellular network base stations, each base station being adapted to communicate with the mobile device and to receive the shopping list and the location of the mobile device when the mobile device is within the base station's geographic coverage area;
a cellular network coupled to the cellular network base stations;
a service provider coupled to the cellular network and adapted to receive the shopping list and the location of the mobile device from the cellular network and transmit the shopping list and location of the mobile device to a database management system via the Internet;
the database management system adapted to receive the shopping list and the location of the mobile device from the network, and further adapted to:
locate businesses within the geographic service area having items matching the shopping list;
provide information about the located businesses to the network;
the network being further adapted to:
receive the information regarding the located businesses from the database management system; and
transmit the information regarding the located businesses to the mobile device.

* * * * *